United States Patent [19]

Takagi et al.

[11] 4,346,364
[45] Aug. 24, 1982

[54] VOICE WARNING SYSTEM FOR AN AUTOMOTIVE VEHICLE WITH READY-TO-DRIVE SENSOR

[75] Inventors: Kazumasa Takagi, Yokohama; Masakazu Tsunoda, Fujisawa, both of Japan

[73] Assignee: Nissan Motor Company, Limited, Kanagawa, Japan

[21] Appl. No.: 182,239

[22] Filed: Aug. 28, 1980

[30] Foreign Application Priority Data

Aug. 31, 1979 [JP] Japan .................................. 54-110251

[51] Int. Cl.³ ........................ B60Q 5/00; G08B 21/00
[52] U.S. Cl. ............................... 340/52 D; 179/1 SM; 340/59; 340/692
[58] Field of Search ....................... 340/692, 59, 52 D; 179/1 SM; 364/425, 424, 442

[56] References Cited

U.S. PATENT DOCUMENTS

| 3,870,818 | 3/1975 | Barton et al. | 340/692 |
| 4,015,237 | 3/1977 | Takatani et al. | 4/52 F |
| 4,072,850 | 2/1978 | McGlynn | 340/52 F |
| 4,188,618 | 2/1980 | Weisbart | 364/424 |

FOREIGN PATENT DOCUMENTS 2627119 12/1976 Fed. Rep. of Germany .
2714621 10/1978 Fed. Rep. of Germany .

OTHER PUBLICATIONS

Bodley, Nicholas, "Here's a Breakthrough–A Low-–Cost Speech Synthesizer on a Chip," *Electronic Design*, 07/19/78.

Primary Examiner—Glen R. Swann, III
Attorney, Agent, or Firm—Lowe, King, Price & Becker

[57] ABSTRACT

A voice warning system for an automotive vehicle informs the driver of the amount of remaining fuel in voice form whenever the driver inserts the ignition key. The system comprises a fuel amount sensing unit, a ready-to-drive sensor, a voice output selector for selectively outputting a voice output designation signal according to the signal from the fuel amount sensing unit, and a voice memory where various voice outputs are stored and are outputted in accordance with the designation signal. The ready-to-drive sensor may be a key sensing switch, a seat switch, or the ignition switch. In addition, a voice warning volume is set in accordance with the car radio system volume setting via a volume memory and a voice volume selector. The voice warning sound volume is adjusted and outputted by an electronic volume controller and a speaker of the car radio system. Additionally, a timer may be used to disenable the system for a predetermined delay interval or according to a predetermined schedule.

14 Claims, 4 Drawing Figures

VOICE WARNING SYSTEM FOR AN AUTOMOTIVE VEHICLE WITH READY-TO-DRIVE SENSOR

BACKGROUND OF THE INVENTION

Field of the Invention

The present invention relates generally to a voice warning system for an automotive vehicle, and more specifically to a voice warning system such that the amount of remaining fuel is indicated to the driver in voice form whenever the driver is ready to drive. The term "ready-to-drive" means here that the driver sits in an automotive vehicle or makes at least one operation necessary to drive after sitting in the vehicle.

Description of the Prior Art

Heretofore, as means for informing the driver of the amount of remaining fuel, there have been used various fuel meters which use, for example, a bimetallic pointer or a warning light for warning the driver that the remaining fuel is less than a predetermined amount (e.g. 10 l). However, since these means can only inform the driver of the amount of remaining fuel through the driver's sense of sight, the driver sometimes may overlook the warning information on remaining fuel, with the result that the car sometimes runs out of fuel while running on the road.

Also, as means for informing the driver of the amount of remaining fuel through the sense of hearing, it is possible to design a device which produces an alarm sound through a buzzer or chime for warning the driver that the remaining fuel is less than a given amount. These devices, of course, can call a driver's attention to the sound, but, the driver cannot in general distinguish an appreciable number of different alarm sounds.

Further, recently, there have appeared vehicles in which a computer is mounted so as to display digitally various vehicle conditions, such as the amount of remaining fuel, whenever pushbuttons are depressed. In this case, however, unless the pushbutton is depressed, it is impossible to check the amount of remaining fuel.

BRIEF SUMMARY OF THE INVENTION

With these problems in mind therefore, it is the primary object of the present invention to provide a voice warning system for an automotive vehicle such that the amount of remaining fuel is informed to the driver in voice form whenever the driver is ready to drive.

To achieve the above-mentioned object, the voice warning system of the present invention comprises fuel amount sensing means for detecting the amount of remaining fuel, ready-to-drive sensing means for detecting a state in which the driver is ready to drive, a voice output selector for selectively outputting a voice output designation signal in accordance with the signal from the fuel amount sensing means whenever a signal is output from the ready-to-drive sensing means, a voice memory for storing voice outputs and for outputting the voice output according to the voice output designation signal to inform the driver of the amount of remaining fuel.

BRIEF DESCRIPTION OF THE DRAWINGS

The features and advantages of the voice warning system according to the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
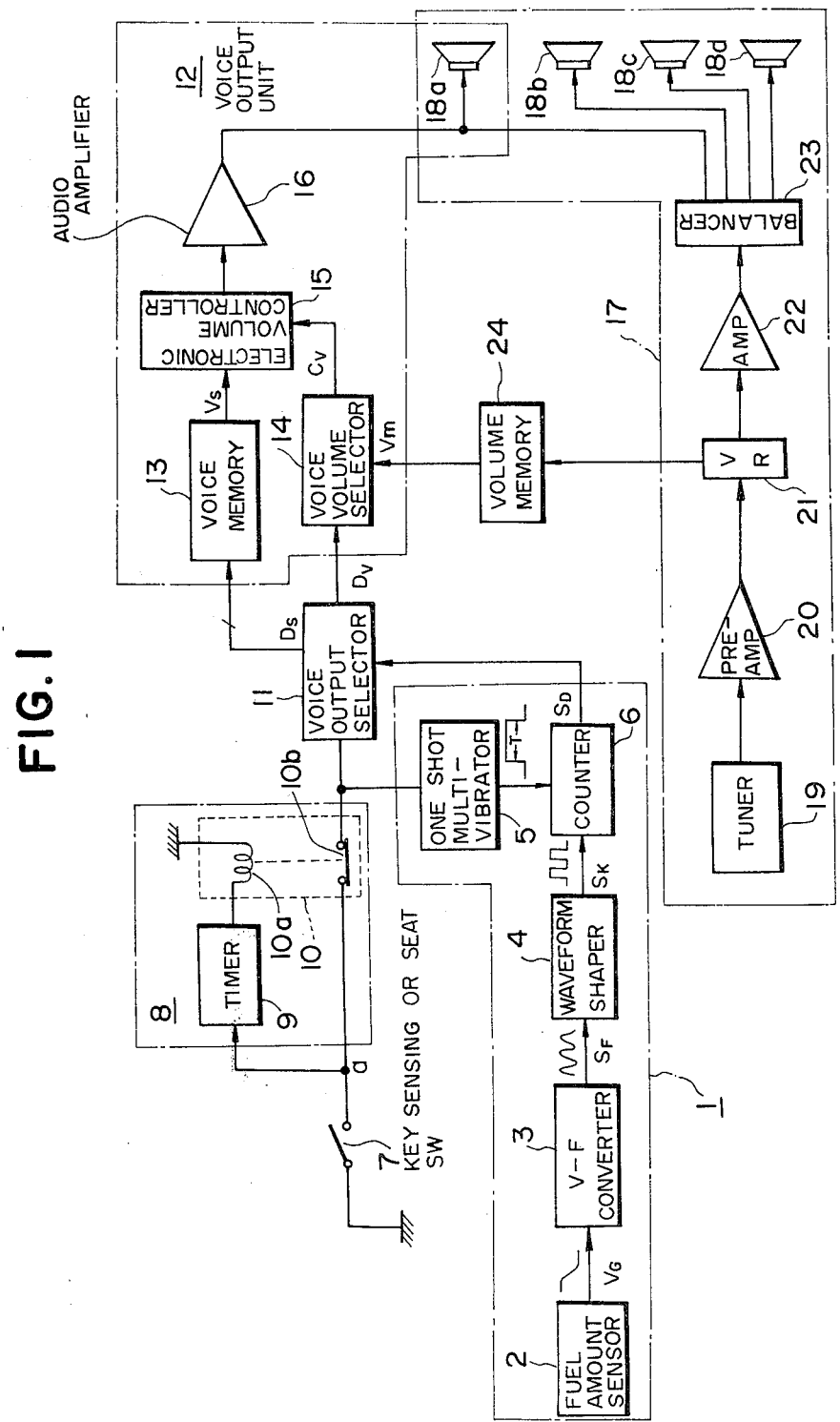
FIG. 1 is a schematic block diagram of a first embodiment of the present invention.

Reference is now made to the figures, and more specifically to FIG. 1, wherein a first preferred embodiment of the present invention is illustrated.

In FIG. 1, the numeral 1 denotes means for detecting the amount of remaining fuel, which includes a fuel amount sensor 2 such as, for example, a float-type fuel meter, a voltage-frequency converter 3 for converting the voltage signal $V_g$ corresponding to the amount of remaining fuel detected by the fuel sensor 2 to a frequency signal $S_f$ corresponding to the voltage $V_g$, a waveform shaper 4 for shaping the output frequency signal $S_f$ into a rectangular wave pulse signal $S_k$, a one-shot multivibrator 5, and a counter 6 for counting the pulse signal $S_k$ only during a period of time T determined by the one-shot multivibrator 5, in order to output a counter signal $S_D$ according to the amount of remaining fuel.

The numeral 7 denotes a key sensing switch for detecting that an ignition key has been inserted by the driver and a state of ready-to-drive has been completed, which grounds the point a, when turned on, to activate the one-shot multivibrator 5, and other units connected thereto. In this case, it may also be possible to use a seat switch to detect the presence of a driver, for the same purpose as described above, in place of the above-mentioned key sensing switch. The switch shall hereinafter be identified as "key sensing switch 7" for brevity.

The numeral 8 denotes a timer assembly for disabling the key sensing switch 7 for a predetermined period of time (for instance, 2 hours) after the key sensing switch 7 is once turned on to ground the point a. The timer assembly includes a timer circuit 9 and a relay 10 having a relay coil 10a and a normally-closed contact 10b. Once the timer circuit 9 is actuated by the key sensing switch 7, a current flows through the relay coil 10a in the relay 10 to open the normally-closed contact 10a. Accordingly, even if the key sensing switch 7 is turned on again within the timer period, the one-shot multivibrator 5 and other units connected to this contact 10b will not be actuated. On the other hand, if the timer period has passed, since the current flowing through the relay coil 10a is cut off, the normally-closed contact 10b is closed to enable the key sensing switch 7 to detect that the driver has inserted the ignition key.

The numeral 11 denotes a voice output selector activated only when the key sensing switch 7 is turned on to ground the point a as explained above, and numeral 13 denotes a voice memory. The voice output selector 11 can select different voice outputs, such as "Remaining fuel is one half", "Remaining fuel is one fourth", or "Refuel, since almost no fuel remains", which are previously stored in the voice memory 13 of a voice output unit 12, in accordance with the counter signal $S_D$ corresponding to the amount of remaining fuel detected by the fuel amount sensing unit 1. In this case, a voice output $V_s$ in the voice memory 13 is selected corresponding to a voice output designation signal $D_s$ outputted from the voice output selector 11 in the form of a binary digit code.

Although the numeral 14 denotes a voice volume selector, in addition to this signal $D_s$ for designating a voice output, a voice volume designation signal $D_v$ is also output from the voice output selector 11 to the voice volume selector 14, at the same time as the signal $D_s$ is output, in order to control the voice level according to the degree of urgency of the fuel situation.

Since the voice output selector 11 can be configured by a wired logic system, it is also possible to implement this function by means of a program by using a microcomputer, as will be explained in the second embodiment.

It is also possible to design the voice output selector 11 so as to be actuated only when the counter signal $S_D$ detects that the amount of remaining fuel is below a given amount (e.g. one fourth). In this case, it may be sufficient for the voice memory 13 to hold only one voice output, such as "Refuel, since remaining fuel is less than one fourth".

In the voice memory 13 of the voice output unit 12, voice warning information in units of sentences, phrases, words, or phones is previously stored as necessary to warn the driver of the amount of fuel, as explained above, and is output as a series of voice signals Vs after selection in accordance with the voice output designation signal $D_s$ generated from the voice output selector 11.

For the voice memory 13, in the case where the number of different items of information is small as, for example, when the amount of remaining fuel is informed or noticed by division into five steps (Full, ¾, ½, ¼, and Empty) it is possible to record the necessary voice information on different tracks of an endless tape, select the track on which necessary voice information is recorded in accordance with the voice output designation signal $D_s$, and reproduce the voice through a speaker. Alternatively, it is possible to use a voice synthesizer based on a linear prediction coding system (LPC) which has recently been put on the market by Texas Instruments Incorporated, as described later in more detail in the second embodiment.

In the voice output unit, the numeral 15 denotes an electronic volume controller of voltage control type including transistors and FETs, whereby the level of the voice signal $V_s$ outputted from the voice memory 13 is controlled according to a voice control signal $C_v$ (explained later) from the voice volume selector 14. The numeral 16 denotes an audio amplifier, and the voice amplified by the audio amplifier 16 is reproduced through one of a plurality of loudspeakers 18a to 18d (18a in FIG. 1) provided for other audio equipment such as a car radio 17.

As is well known, a conventional car radio 17 comprises a tuner 19, a pre-amplifier 20, a volume control 21 (variable resistor), an amplifier 22, and a balancer 23 to balance the respective sound volume of the speakers 18a–18d (unnecessary when only one speaker is used).

The numeral 24 denotes a volume memory for storing a sound volume value as set by the volume control 21 in the car radio 17. When a usual rotary type or linear motion type variable resistor is used for the control 21, a variable resistor of the same type can be used by connection thereto. On the other hand, when an electronic volume control is used (controllable from the outside), the volume memory 24 must store the control voltage signal electrically even when the power supply of the car radio 17 is turned off at the time when this stored sound volume signal $V_m$ is output to the voice volume selector 14.

The voice volume selector 14 is provided in order to control the voice volume according to the degree of urgency of the remaining fuel situation and the sound volume as adjusted by driver preference. In other words, the volume setting of the car radio is indicated by the sound volume signal $V_m$ stored in the volume memory 24 and, according to this signal $V_m$, the overall voltage level of the volume control signal $C_v$ is shifted in the voice volume selector 14 so as to produce a louder voice relative to the voice volume from the car radio.

On the other hand, the voltage level of the volume control signal $C_v$ is controlled in the voice volume selector 14 so as to produce a louder voice in inverse proportion to the amount of remaining fuel according to the voice volume designation signal $D_v$ from the voice selector 11.

As explained above, the voice output unit 12 comprises the voice memory 13, voice volume selector 14, the electronic volume controller 15, the audio amplifier 16, and the loudspeaker 18a, in order to produce the voice output for indicating the amount of remaining fuel in accordance with the voice output designation signal $D_s$ selected by the voice output selector 11.

Since the first embodiment is thus configured, whenever the driver inserts the ignition key the amount of remaining fuel is indicated to the driver in voice form.

In this first embodiment, the power supply is so designed to be turned on for operating all units other than the car radio 17, whenever the key sensing switch 7 is turned on. It is also possible to provide the electronic volume controller 15 within the audio amplifier 16 or to use a variable gain amplifier (VGA) of voltage control type for the audio amplifier 16.

Figure 2:
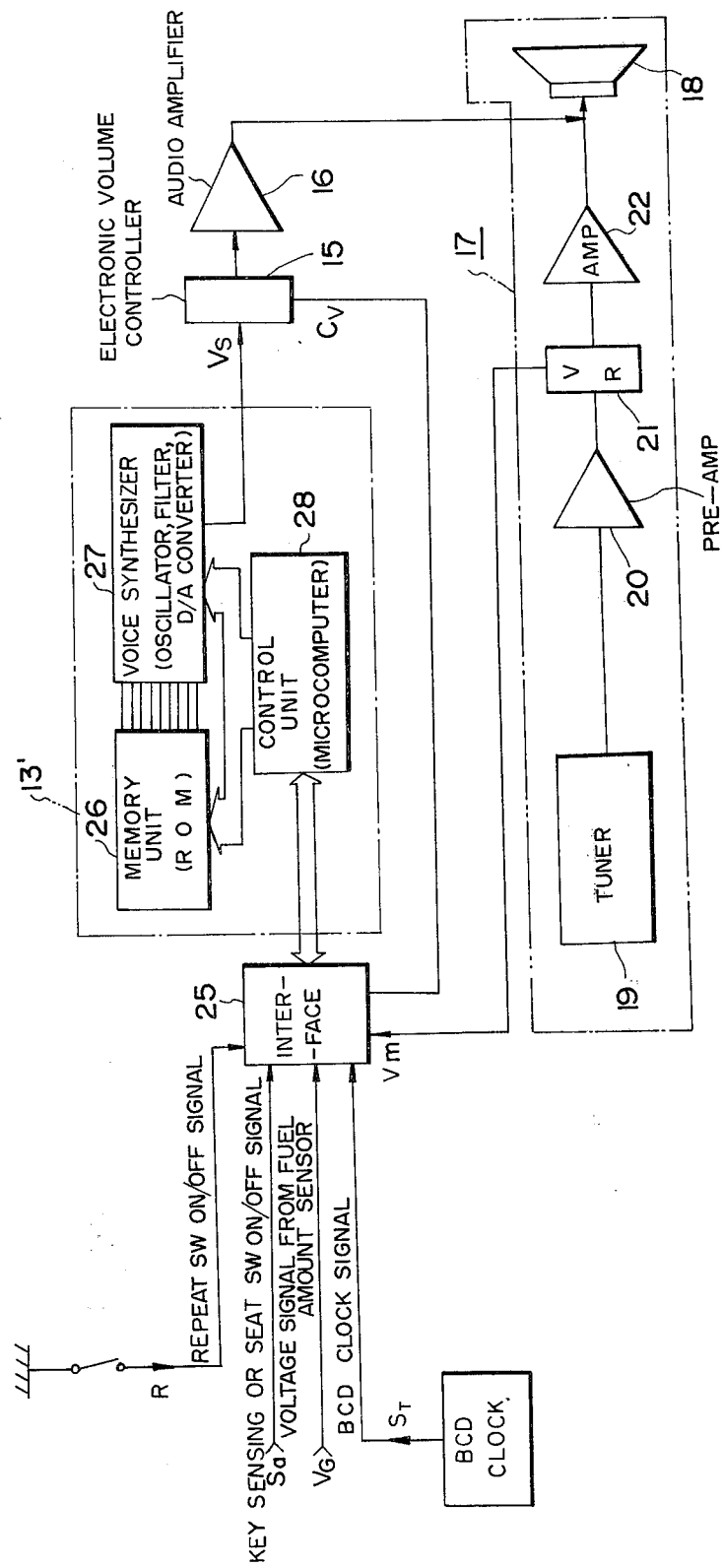
FIG. 2 is a schematic block diagram of a second embodiment of the present invention.
Figure 3:
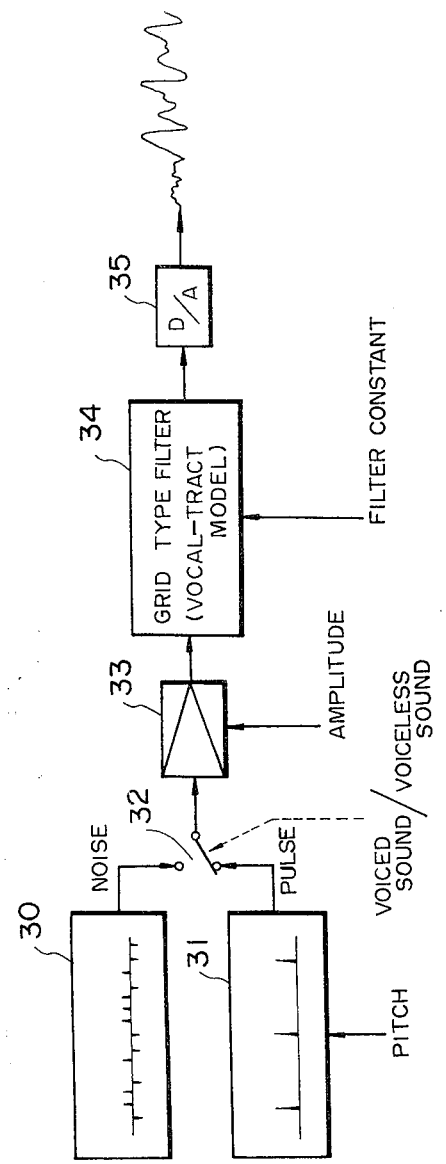
FIG. 3 is a schematic block diagram of assistance in explaining the theory of operation of a voice synthesizer using the linear prediction code system.

FIGS. 2 and 3 show a second embodiment of the present invention.

In FIG. 2, the numeral 25 denotes an input/output interface for a microcomputer, which also includes, for example, a multiplexer, an A-D converter for performing the same function as the V-F converter 3 and the waveform shaper 4 of FIG. 1, and the like.

Various signals are input to the interface 25 such as a voltage signal $V_g$ from the fuel amount sensor 2 of FIG. 1, an ON/OFF signal $S_a$ from the key sensing switch 7, a BCD clock signal $S_T$ from an electronic clock (not shown) to indicate the time, an ON/OFF signal R from a repeat switch (not shown), and a sound volume signal $V_m$ for indicating the volume setting of the volume control 21 of the car radio 17.

In this case, the reason the ON/OFF signal R from the repeat switch is input is that it is possible to hear the fuel information again by depressing the repeat switch, even if the driver fails to hear the warning information on the amount of remaining fuel.

Also, the reason the BCD clock signal $S_T$ is input is that it is necessary to indicate the time in addition to the warning information on the amount of remaining fuel.

In FIG. 2, the numeral 13' denotes a voice synthesizer using a linear prediction coding (LPC) system including three LSI units: a memory unit (ROM) 26, a synthesizer unit 27 (oscillator, filters, and D-A converters), and a control unit (microcomputer), which corresponds to the voice memory 13 in FIG. 1. This control unit 28 is a microcomputer comprising a CPU for controlling all the operations, a memory (ROM) for storing programs and fixed data, a memory (RAM) for storing input/output data, a clock oscillator, etc., which can implement all the operations corresponding to the one-shot multivibrator 5, the counter 6, the timer 8, the voice selector 11, the voice volume selector 14, the volume memory 24, etc., as explained as the first embodiment in FIG. 1, using time sharing.

As is well known in the art, a voice synthesizer based on the LPC system has recently been introduced into the market at a reasonable price by Texas Instruments Incorporated of the U.S.A. FIG. 3 shows schematically the principle of this voice synthesizer.

In this synthesizer, pseudo-random noise signals generated from the first sound source oscillator (white noise generator) 30 are selected by a switch 32 in the case of voiceless sounds; periodic impulse signals generated from the second source oscillator (impulse generator) 31 are selected by the switch 32 in the case of voiced sound. After being amplified by an amplifier 33, these signals and are formed into a voice sound by a grid-type filter 34 where the resonance characteristics of human vocal tract (vocal organs such as tongue and lips located above the vocal chords) in speaking are modeled, and are outputted as a synthesized voice signal after convertion into an analog signal through a D-A converter 35.

The different values of constants such as the pitch of the periodic impulse signal, the difference between voiced sound and voiceless sound, the amplification ratio of the amplifier 33, and the filter constant of the grid-type filter 34, etc. and are stored in the memory unit (ROM) 26 of FIG. 2.

The synthesizer 27 comprises various circuits which correspond to a first sound source oscillator 30, a second sound source oscillator 31, a switch 32, an amplifier 33, a grid-type filter 34, and a D-A converter 35 so that the synthesized voice sound signal $V_s$ necessary for warning information can be output after being controlled according to the output signal selected by the controller 28.

As in the first embodiment, the microcomputer as the controller 28 can also determine the voice output according to the amount of remaining fuel, decide the volume of voice according to the volume setting of the volume control 21 of the car radio 17, and output a sound volume control signal $C_r$ through the interface 25 to operate the electronic volume controller 15.

Figure 4:
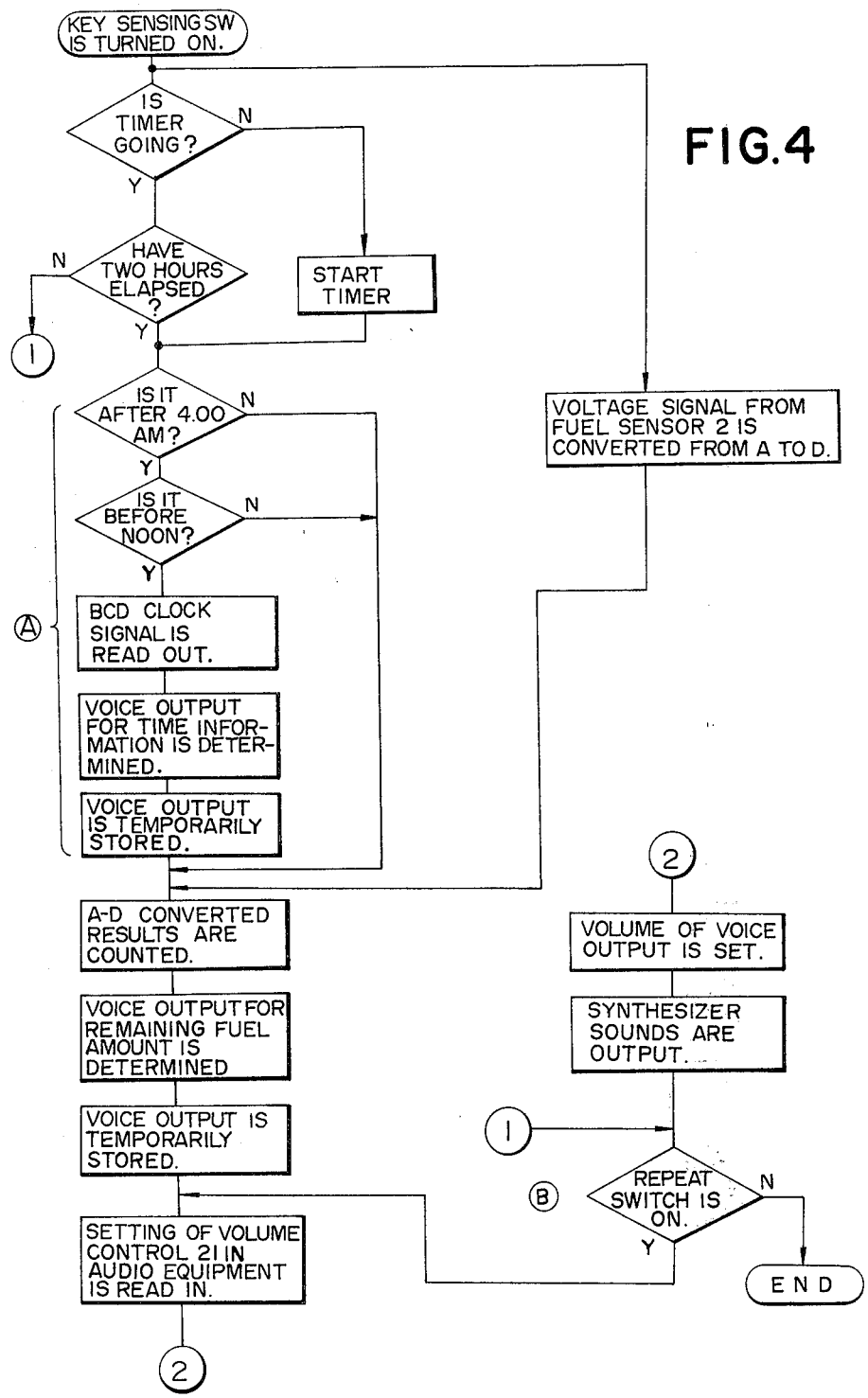
FIG. 4 is an example flowchart of a program when a microcomputer is used with the embodiment of the present invention.

FIG. 4 shows an example flowchart used for the second embodiment.

In this flowchart, when the key sensing switch 7 is turned on (block 1), the voltage signal $V_g$ from the fuel amount sensor 2 is converted from analog into digital (block 10); the signal converted into digital is counted by the counter 6 (block 11); the voice output for remaining fuel amount is determined by the voice selector 11 (block 12); the voice output is temporarily stored in the voice memory (block 13); the setting of the volume control 21 of the audio device (e.g. car radio) is read into the volume memory 24 (block 14); the sound volume of the voice output is preset by the voice volume selector 14 (block 15); and then the necessary warning is output (block 16).

On the other hand, at the same time that the key sensing switch 7 is turned on, first the timer is checked (block 2). If it is not going it is started (block 3); otherwise if two hours has elapsed (block 4) the control proceeds. If it is between 4:00 AM (block 5) and noon (block 16), the BCD signal from the clock is read (block 7); voice output for time information is decided according to the time (block 8); this output is temporarily stored in the memory (block 9); and the voice is output together with the signal $V_g$ (voltage signal from the fuel amount sensor 2). In other words, the blocks from 5 to 9 bracketed by mark A in FIG. 4 forms a program to produce time information such as "Good morning, it is now 8:53 AM." depending on the BCD signal $S_t$ from the clock if the driver inserted the ignition key at a time between 4:00 AM and noon.

In addition, if the repeat switch is turned on (block 17), the program repeats the steps beginning from block 14 again.

As described above, since the amount of remaining fuel is directly indicated audibly to the driver whenever he is ready to drive, it is possible to provide the driver with accurate information on remaining fuel before driving.

In addition to the above, when the ignition switch is used as the means for detecting the state of ready-to-drive, it is possible to detect this state without any additional switch, and to inform the driver of the remaining fuel amount before the engine starts. On the other hand, if a seat switch is used for the same purpose, it is possible to inform the driver of the remaining fuel amount earlier.

Further, if a timer is provided to disable the key sensing function until a predetermined time period (e.g. two hours) has passed after the state of ready-to-drive drive is once detected, it is possible to prevent such nuisance that the voice warning information is repeated many times when the driver gets in or out of the car repeatedly.

Furthermore, if the voice warning system is so designed as to inform the driver only when the remaining fuel amount decreases below a predetermined level, this method may be able to warn the driver more effectively.

It will be understood by those skilled in the art that the foregoing description is in terms of preferred embodiments of the present invention wherein various changes and modifications may be made without departing from the spirit and scope of the invention, which is to be defined by the appended claims.

What is claimed is:

1. A voice warning system for an automotive vehicle, which comprises:
   (a) fuel amount sensing means for detecting the amount of remaining fuel;
   (b) ready-to-drive sensing means for detecting that the driver is ready to drive;
   (c) a voice output selector for selectively outputting a voice output designation signal in accordance with a signal from said fuel amount sensing means whenever the signal from said ready-to-drive sensing menas is input thereto;
   (d) a voice memory for storing necessary voice outputs and for outputting a series of voice signals $V_s$ in accordance with the voice output designation signal $D_s$ from said voice output selector,
   whereby the amount of remaining fuel is informed to the driver in voice form whenever the driver is ready to drive.

2. A voice warning system for an automative vehicle as set forth in claim 1, wherein said ready-to-drive sensing means comprises a timer for disabling the detection function thereof for a predetermined period of time after detecting a state of ready-to-drive and outputting a signal to said voice output selector, so that it is possible to prevent such nuisance that voice warning information is repeated many times within a short time.

3. A voice warning system for an automative vehicle as set forth in claim 2, which further comprises:
  (a) an electronic volume controller for controlling the level of voice signal $V_s$ outputted from said voice memory;
  (b) a volume memory for storing the volume setting of other audio equipment within the automotive vehicle; and
  (c) a voice volume selector for determining the voice volume according to the degree of urgency of the remaining fuel amount in accordance with a voice volume designation signal $D_v$ from said voice output selector and according to the degree of voice volume of other audio equipment provided within the same vehicle in accordance with a sound volume signal $V_m$ from said volume memory, by outputting a volume control signal $C_v$ to said electronic volume controller.

4. A voice warning system for an automative vehicle as set forth in claim 3, wherein said fuel amount sensing means comprises:
  (a) a fuel amount sensor for producing a voltage signal $V_G$ indicating the amount of remaining fuel;
  (b) a voltage-frequency converter for converting the analog signal $V_G$ into a frequency signal $S_F$,
  (c) a waveform shaper for shaping the frequency signal $S_F$ into a rectangular wave pulse signal $S_k$;
  (d) a one-shot multivibrator for producing a pulse signal with a pulsewidth of predetermined period T; and
  (e) a counter for counting the pulses of the pulse signal $S_k$, only during a period of time determined by said one-shot multivibrator.

5. A voice warning system for an automotive vehicle as set forth in claim 4, which further comprises an audio amplifier for amplifying the voice information outputted from said electronic volume controller.

6. A voice warning system for an automotive vehicle as set forth in any of claims 1, 2, 3, 4, or 5, wherein said voice output selector outputs a voice output designation signal $D_s$ to said voice memory only when said fuel amount sensing means detects that the amount of remaining fuel is below a predetermined level.

7. A voice warning system for an automotive vehicle as set forth in any of claims 1, 2, 3, 4, or 5, wherein said ready-to-drive sensing means is a key sensing switch which detects when an ignition key is inserted into a key hole.

8. A voice warning system for an automotive vehicle as set forth in any of claims 1, 2, 3, 4, or 5, wherein said ready-to-drive sensing means is a seat switch which detects that the driver is sitting in the seat for driving.

9. A voice warning system for an automotive vehicle as set forth in claim 2, which further comprises a repeat switch to output selectively voice information even while the timer is disabling the detection function thereof, whenever the driver wants to hear the voice information.

10. A voice warning system for an automotive vehicle comprising:
  (a) a fuel amount sensor for detecting the quantity of remaining fuel;
  (b) a ready-to-drive sensor for detecting that the driver is ready to use the vehicle;
  (c) a clock for outputting a BCD clock signal $S_T$ indicative of the time;
  (d) a repeat switch for actuating the system when actuated by a vehicle user;
  (e) a volume control for adjusting the sound volume of other audio equipment in the vehicle; and
  (f) a voice synthesizer system responsive to the signals from the fuel amount sensor, the ready-to-drive sensor, the clock, the repeat switch, and the volume control for generating and outputting a voice warning indicative of the remaining fuel quantity when the ready-to-drive sensor produces a signal $S_a$ indicating that the driver is ready to use the vehicle or when the repeat switch is actuated, and for generating and outputting a time information message in response to the ready-to-drive sensor signal $S_a$ and the BCD clock signal $S_T$.

11. The voice warning system as set forth in claim 10, wherein said voice synthesizer system comprises:
  (a) an interface for converting the outputs of the fuel amount sensor, the ready-to-drive sensor, the clock, the repeat switch, and the volume control to digital signals;
  (b) a linear-predictive-coding-type voice synthesizer responsive to the signals from the interface for generating a voice warning signal $V_s$ when the ready-to-drive sensor signal $S_a$ is produced or when the repeat switch is actuated, for generating a time information message signal in response to the ready-to-drive sensor signal $S_s$ and the BCD clock signal $S_T$, and for generating a volume control signal $C_v$ in response to the output from the volume control, the volume control signal $C_v$ being output through said interface; and
  (c) an electronic volume controller responsive to the time information message signal, the voice warning signal $V_s$, and the volume control signal $C_v$ for adjusting the volume level of the voice warning signal $V_s$ and the time information message signal according to the volume control signal $C_v$, and for outputting said adjusted signals through the other audio equipment of the vehicle.

12. The voice warning system as set forth in claim 10, wherein the time information message is outputted only when the BCD clock signal indicates that the time is between about 4:00 AM and about noon.

13. The voice warning system as set forth in any one of claims 10, 11, or 12, wherein the ready-to-drive sensor is a key sensing switch for producing a signal when a key is inserted into the ignition key cylinder.

14. The voice warning system as set forth in any one of claims 10, 11 or 12, wherein the ready-to-drive sensor is a seat switch for producing a signal when a weight commensurate to a human body is applied to the driver's seat.

* * * * *